Aug. 30, 1932.  G. A. SHAFFER ET AL  1,874,642
NAPKIN DISPENSER
Filed July 8, 1927  4 Sheets-Sheet 1
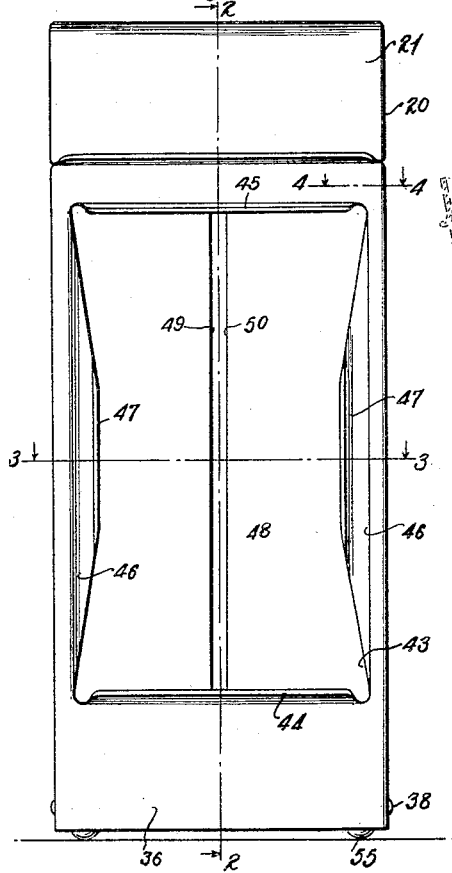
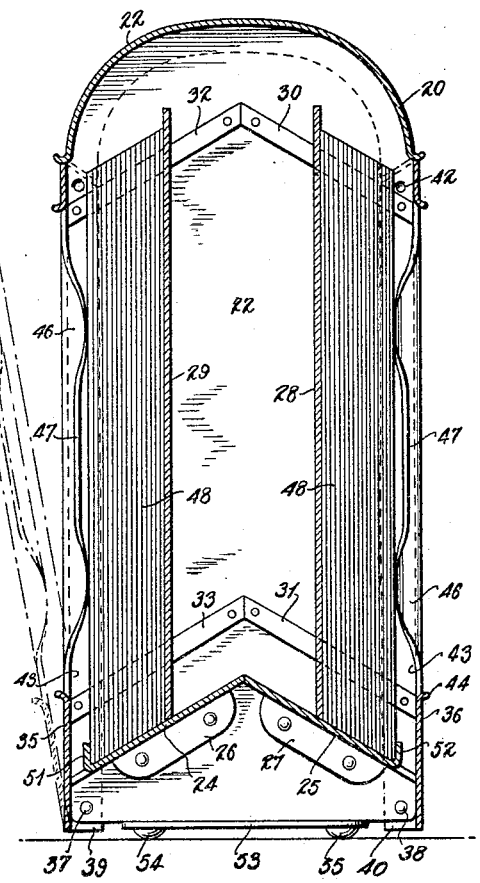
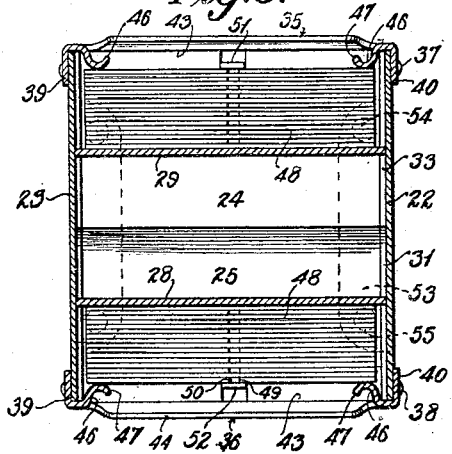
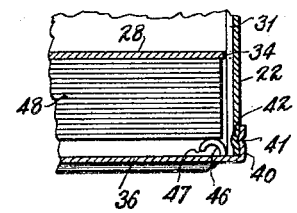
INVENTORS
Glenn A. Shaffer
and Franklin H. Wirtz
BY
ATTORNEYS Aug. 30, 1932.  G. A. SHAFFER ET AL  1,874,642
NAPKIN DISPENSER
Filed July 8, 1927  4 Sheets-Sheet 2
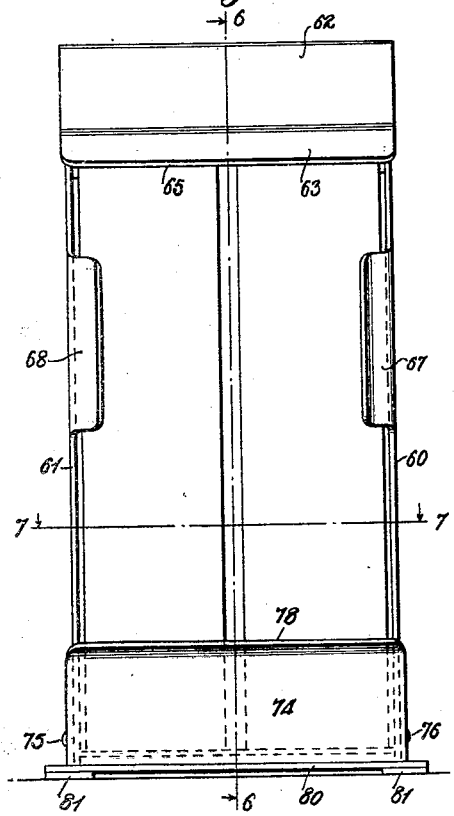
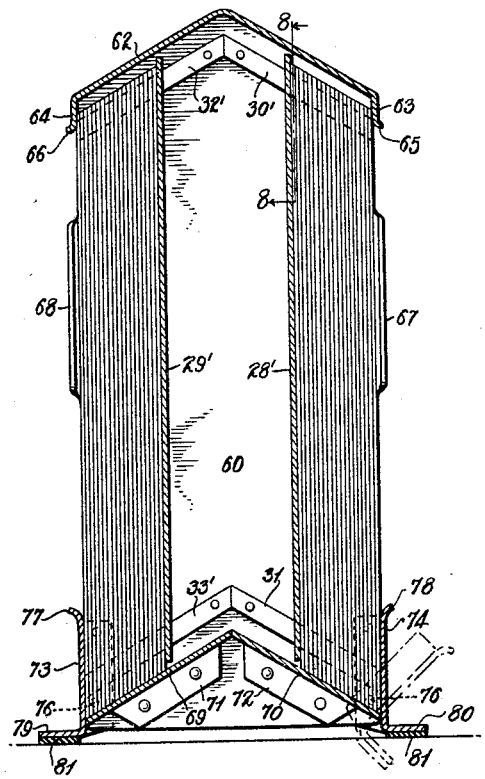
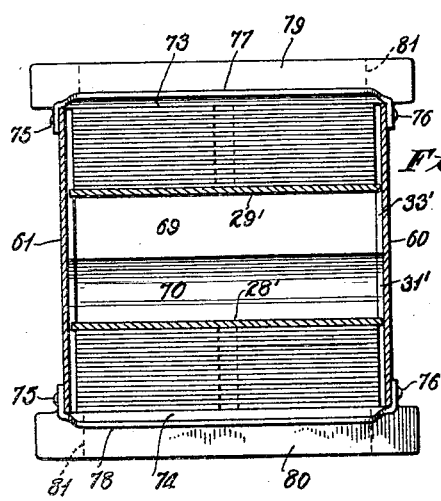
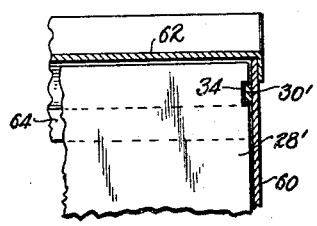
INVENTORS
Glenn A. Shaffer
and Franklin H. Wirtz
BY
ATTORNEYS

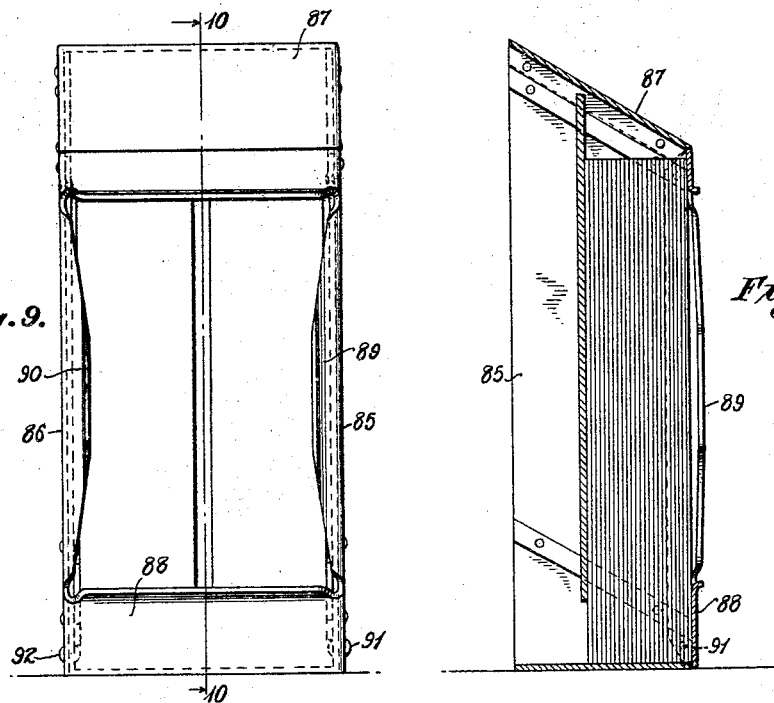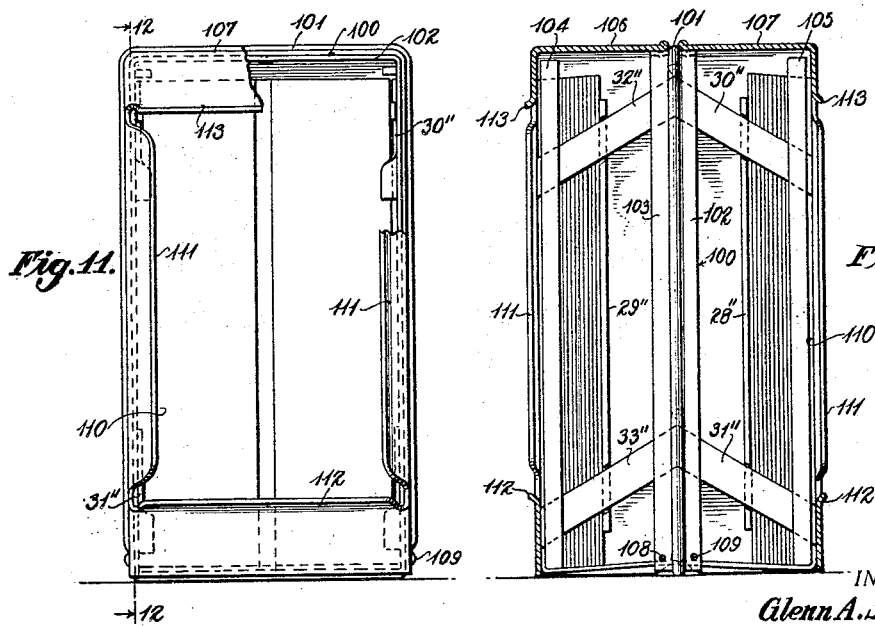

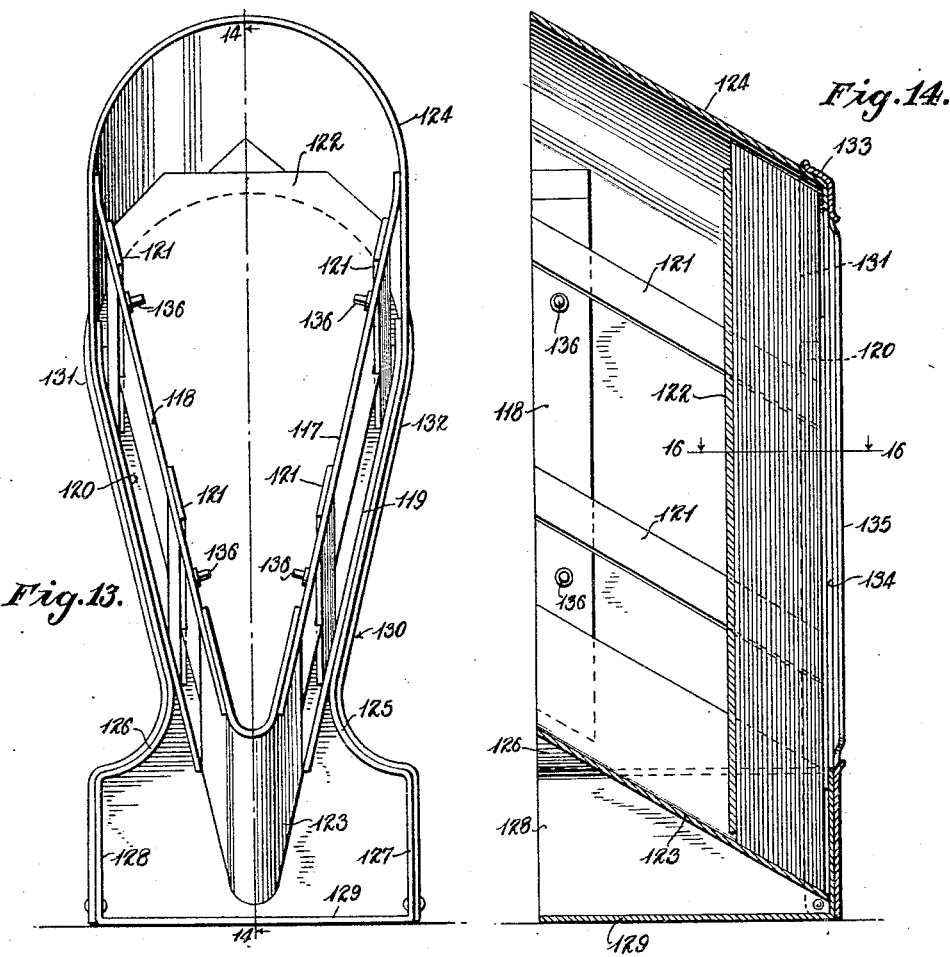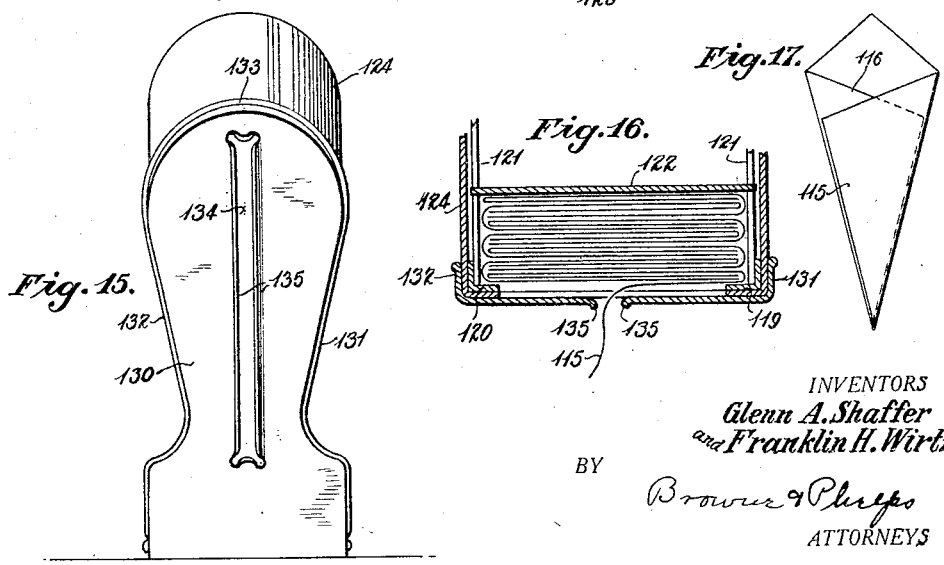

Patented Aug. 30, 1932

1,874,642

UNITED STATES PATENT OFFICE

GLENN A. SHAFFER AND FRANKLIN H. WIRTZ, OF GREEN BAY, WISCONSIN, ASSIGNORS TO FORT HOWARD PAPER COMPANY, OF GREEN BAY, WISCONSIN, A CORPORATION OF WISCONSIN

NAPKIN DISPENSER

Application filed July 8, 1927. Serial No. 204,295.

The invention relates to fixtures for dispensing paper napkins or the like and has as an object the provision in such a fixture of the upright variety, of means to feed the napkins toward the dispensing face of the fixture.

It is a further object of the invention to provide a fixture which is convenient for replacement of sheets therein.

Further objects of the invention will appear from the following description when read in connection with the accompanying drawings showing illustrative embodiment of the invention and wherein:

Figure 1 is a face view;

Fig. 2 is a vertical section on line 2—2 of Fig. 1;

Fig. 3 is a horizontal section on line 3—3 of Fig. 1;

Fig. 4 is a detail section on line 4—4 of Fig. 1, all one form of the invention;

Fig. 5 is a side elevation of a second form of the invention;

Fig. 6 is a vertical section on line 6—6 of Fig. 5;

Fig. 7 is a horizontal section on line 7—7 of Fig. 5;

Fig. 8 is a detail vertical section on line 8—8 of Fig. 6;

Fig. 9 is a side elevation of a still further modification;

Fig. 10 is a vertical section on line 10—10 of Fig. 9;

Fig. 11 is the front elevation of a further modification;

Fig. 12 is vertical section on line 12—12 of Fig. 11;

Fig. 13 is a rear elevation of a further modified form of the invention;

Fig. 14 is a vertical section on line 14—14 of Fig. 13;

Fig. 15 is a front elevation of the form of Fig. 13 upon a reduced scale;

Fig. 16 is a detail horizontal section on line 16—16 of Fig. 14; and

Fig. 17 is a front elevation of a form of folded napkin adapted to be dispensed by the form of the device illustrated in Figures 13 to 16 inclusive.

As shown in Figures 1 to 4 inclusive the device comprises an upright fixture adapted to dispense sheets from either face thereof and comprises an upright casing 20 desirably formed with a rounded top 21 and side walls 22, 23. To assist in the feeding of the napkins toward the respective faces of the fixture, the bottom as shown is formed of two sloping portions 24, 25 indicated as secured between the side walls 22, 23 by means of flanges 26, 27, turned downwardly from the material of the bottom portions and riveted or electric welded to said side walls.

To feed sheets forwardly in the fixture toward each face thereof, there are shown sliding plates 28, 29 guided in their sliding movement by ways in the form of flat ribs 30, 31, and 32, 33. To coact with the ways the plates 28, 29, which are formed of a width to have a sliding fit between the side walls 22, 23, are formed with notches to fit over the ribs, one of which notches is indicated at 34, Figure 4.

To permit filling of the fixture with napkins there are shown doors 35, 36 hinged to the respective sides of the fixture as at 37, 38, the doors formed with side flanges 39, 40 overlapping the side walls 22, 23 when in closed position as shown in Figure 3. To retain the doors in their closed position, the upper ends of flanges 39, 40 are formed with indentations 41, each forming a boss upon the interior of the flange, which bosses snap into indentations 42 in the side walls when the doors are closed.

To permit removal of napkins from the fixture, the doors are shown as formed with openings 43, the upper and lower edges of the openings being desirably curved outwardly as shown at 44, 45. The side edges of the openings are shown as curved first inwardly as shown at 46 and again turned outwardly as shown at 47. The inturned portions 46 of the door openings thus press upon the vertical edges of the folded sheets 48 in the receptacle to cause the ends of the sheets to be first pulled free therefrom.

The sheets to be dispensed from the fixture are preferably such as are folded to present an intermediate tab adjacent the center portion of the face of the sheet to be grasped by the user for withdrawal of the sheet. The edges of two such tabs are indicated at 49, 50 in Figure 1 of the drawings. To prevent the lower ends of the napkins from slipping forwardly in the fixture when the doors 35, 36 are opened, the sloping bottoms 24, 25 are shown as formed with lugs 51, 52 struck upwardly upon the material thereof, which lugs also stop forward movement of plates 28, 29, when the fixture is empty. The lugs 51, 52 are shown as standing substantially in the plane of the inturned portions 46 of the doors. The fixture may be formed with an exterior bottom 53 provided with supporting bosses 54, 55.

The form of the invention of Figures 5 to 8 inclusive is shown as comprising side walls 60, 61, a top 62 rigidly carried by said side walls, the edges of the top down-turned as at 63, 64 and the margins thereof as turned outwardly as at 65, 66 to provide an upper edge of the opening from which the sheets may be extracted. The faces of this form of the invention are left entirely open at the sides with the exception of the inturned flanges 67, 68 shown as integral with the side wall 60, 61 and sloping bottom portions 69, 70 are shown as secured between the side walls by means of flanges 71, 72 secured to the side walls. To retain the bottom ends of the sheets in this form of the receptacle, there are shown flaps 73, 74 hinged as at 75, 76, to the side wall, the upper margins 77, 78 of the flaps being curved outwardly as shown.

To support the fixture shown by this form of the invention and to retain the flaps in closed position, their lower edges are shown as turned outwardly at substantially right angles as at 79, 80, supporting blocks 81 being desirably provided upon the supporting flanges.

This form of the invention is also provided with plates 28', 29' guided in ways 30', 31', 32', 33' in the form similar to that shown in Figures 1 to 4 inclusive.

This form of the invention may be filled with napkins by laying the fixture down upon one of its faces and turning the upper flap outwardly to the position shown in dotted lines in Figure 6 when the sheets may be slipped under the flanges 67, 68 and under flange 63 or 64 when the bottom of the sheets may be slipped into the receptacle and the flap closed. Contact of flanges 79, 80 or the blocks 81 with the supporting surface will retain the flaps in closed position.

The form of the invention shown in Figures 9 and 10 is designed for use from one side only and comprises side walls 85, 86 and a sloping top wall 87 rigidly secured thereto. This form of the invention is shown as provided with a door 88 similar to the door 35 or 36 of Figures 1 to 4 inclusive with the exception that the side flanges 89, 90 are not curved inwardly. This door is hinged to the receptacle as at 91, 92 and acts in all respects similar to the doors 35, 36 already described.

The form of the invention shown in Figures 11 and 12 comprises a frame formed of a central upright inverted U-shaped member 100 shown as formed with a central rib 101 flanked by flange members 102, 103 and other upright members 104, 105, lying in the plane of flanges 102, 103. The ways 30'', 31'', 32'', 33'' are supported upon the frame provided by the central upright 100 and the side uprights 104, 105. The casing of the fixture is formed by box-like members 106, 107 hinged to the lower ends of the upright 100 as indicated at 108, 109 and having their open sides telescoping with the flanges 102, 103, the outer sides of the members 106, 107 being formed with the openings 110 to permit the withdrawal of the napkins, the margins of the openings being outwardly curved as at 111, 112, 113.

This form of the device is shown as provided with sliding plates 28'', 29'', cooperating with the ways 31''-33'' inclusive as in the forms of the invention already described.

The form of the invention shown in Figures 13 to 16 inclusive is designed for the dispensing of a cornucopia folded napkin such as shown in Figure 17, packaged with the folded sheets in interfolded relation as indicated in Figure 16 wherein the flap 115 of each napkin overlies the flap 116 and the body of the preceding napkin whereby the extraction of one of the folded sheets will bring the flap 115 of the succeeding sheet into the position to be grasped by the hand of the user.

In this form of the device the fixture comprises a frame formed of downwardly sloping bars 117, 118, and 119, 120, the bars 119, 120 being formed of angles as shown in Figure 16, which bars support the ways 121, the ways cooperating with the sliding plate 122 to feed the napkins forwardly in the receptacle. Between the bars 117 to 120 inclusive at their lower ends there is shown trough-like member 123 for support of the apex of the napkins, the trough downwardly and forwardly sloping as in Figure 14.

The frame thus described is shown as covered by an outer casing 124 curved at its upper portion to provide a pleasing appearance, sloping downwardly and inwardly at its side portions which are secured to the frame already described and then curving outwardly as at 125, 126, and formed with vertical sides 127, 128 of a base formed with bottom 129, thus enclosing the trough 123.

The front 130 of the receptacle is formed as shown in Figure 15 and is provided with side flanges 131, 132 to over-lap the side walls of the fixture, the top of the same over-lapping the curved upper portion as shown at 133.

To permit withdrawal of napkins from the fixture the front 130 is shown as formed with a vertical slot 134 desirably having its margins outwardly curved as indicated at 135 from which the tabs 115 of the napkins project for withdrawal from the fixture.

To prevent the escape of plate 122 from the rear of the fixture there are shown pins 136 projecting from the frame members 117, 118.

Minor changes may be made in the physical embodiments of the invention within the scope of the appended claims without departure from the spirit thereof.

We claim:

1. A napkin dispenser comprising, in combination, a casing, upper and lower downwardly and forwardly sloping ways carried by the side walls of the casing, a vertical sliding plate notched about said ways, an upper and a lower shoulder provided by each of the notches, one of said shoulders coacting with each of the upper and the lower surfaces of each of said ways to retain the plate in vertical position during its sliding movement, said casing having an opening in its face toward which sheets may be urged by said plate and through which said sheets may be withdrawn.

2. A napkin dispenser comprising, in combination, a casing, upper and lower downwardly and forwardly sloping ways carried by the side walls of the casing adjacent the top and bottom thereof, each of said ways comprising a bar secured flat-wise to the inner surface of the walls, a vertical sliding plate fitting transversely within said casing and having notches fitting about said plate, each notch providing shoulders coacting with the upper and lower surfaces respectively of each of said ways coacting with said ways to preserve the vertical position of the plate during its sliding movement, said casing provided with an opening in its face toward which sheets may be urged by said plate and through which said sheets may be withdrawn.

3. A napkin dispenser comprising, in combination: a casing, upper and lower downwardly and forwardly sloping ways carried by the side walls of the casing; a vertical sliding plate in said casing; and means carried by the vertical edges of said plate providing tongue and groove coaction with said ways whereby the means carried by the edges of the plate coact with the upper and the lower surface of the ways to retain the plate in vertical position during its sliding movement; said casing having an opening in its face toward which the sheets may be urged by said plate and through which said sheets may be withdrawn.

GLENN A. SHAFFER.
FRANKLIN H. WIRTZ.